Aug. 18, 1931.    H. A. DENMIRE    1,819,773
FABRIC CUTTING MACHINE
Filed Feb. 18, 1924    2 Sheets-Sheet 1

Inventor
HAROLD A. DENMIRE.

By
Attorney

Aug. 18, 1931.  H. A. DENMIRE  1,819,773
FABRIC CUTTING MACHINE
Filed Feb. 18, 1924  2 Sheets-Sheet 2

Inventor
HAROLD A. DENMIRE.
By
Attorney

Patented Aug. 18, 1931

1,819,773

UNITED STATES PATENT OFFICE

HAROLD A. DENMIRE, OF AKRON, OHIO, ASSIGNOR TO THE GENERAL TIRE AND RUBBER COMPANY, OF AKRON, OHIO, A CORPORATION OF OHIO

FABRIC CUTTING MACHINE

Application filed February 18, 1924. Serial No. 693,421.

Heretofore, I have invented an improved machine for cutting fabric on the bias, which is particularly designed for use in cutting rubberized fabric such as used in tire manufacture, although it may have other adaptations. The machine which is covered in my prior application Serial No. 639,509, filed May 17, 1923, is constructed upon the principle of having a continuously moving band knife or saw which is raised and lowered intermittently upon fabric in conjunction with spring actuated clamps which hold the fabric during the cutting operation. The fabric is supported upon an intermittently moved belt which is operated while the knife is raised above the fabric.

The object of the present invention is to improve upon some of the details of the apparatus, particularly the knife or band which cuts the fabric and to the mechanism for raising and lowering the band.

Figure 1:
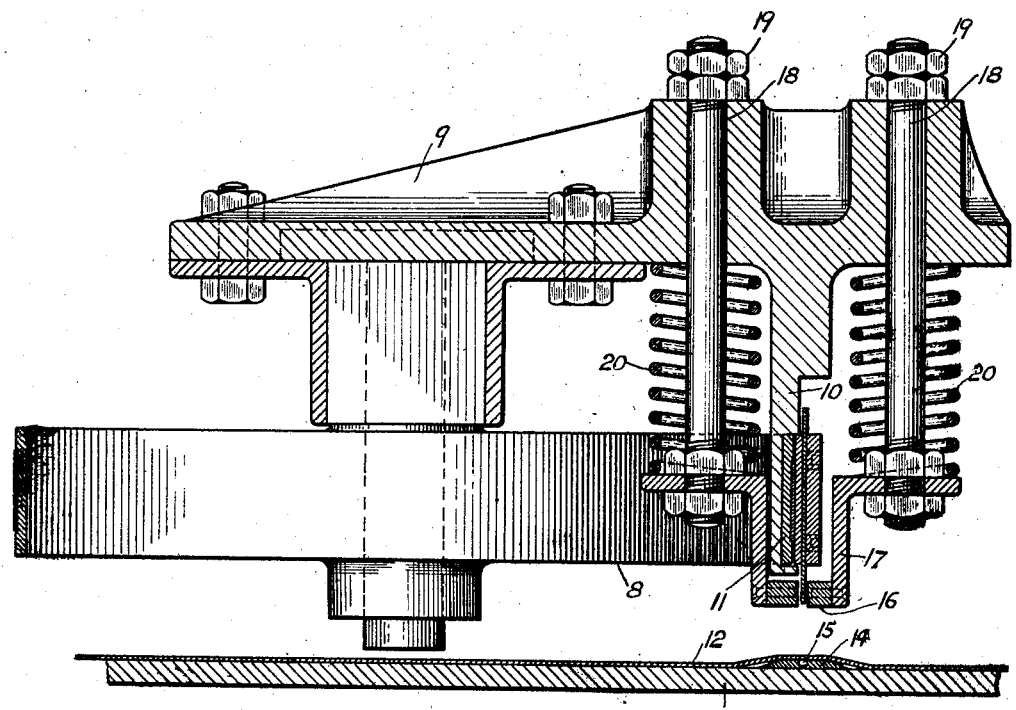
Figure 1 is a transverse section through the knife head.
Figure 2:
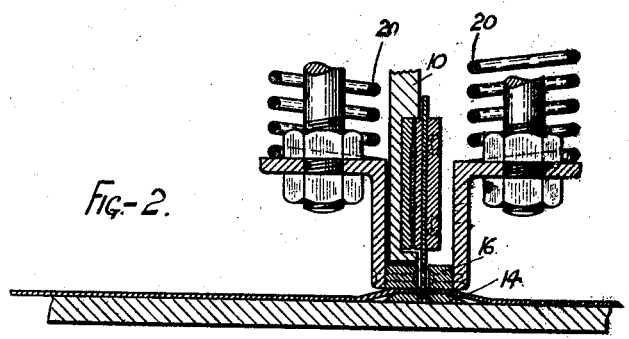
Figure 2 is a fragmentary view of the knife at the moment of cutting.
Figure 4:
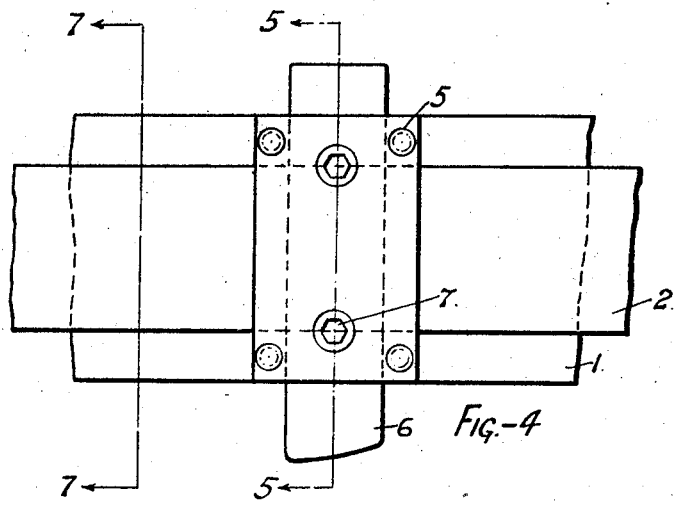
Figure 4 is an enlarged detail.
Figure 5:
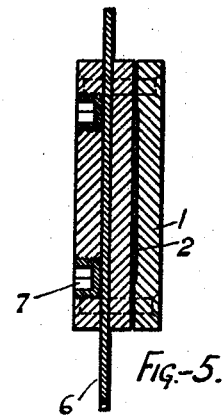
Figure 5 is a section on the line 5—5 of Figure 4.
Figure 6:
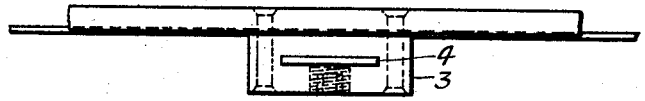
Figure 6 is a plan of Figure 4.
Figure 7:
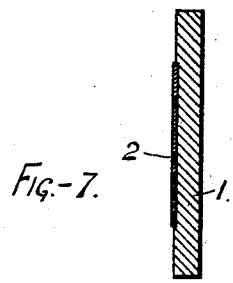
Figure 7 is a section on the line 7—7 of Figure 4.
Figure 3:
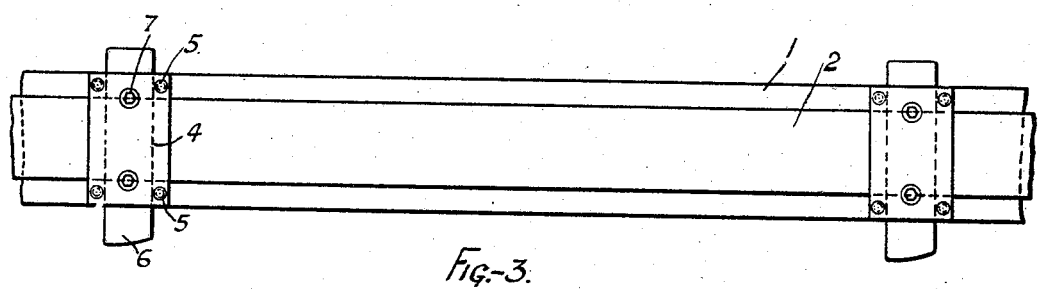
Figure 3 is an elevation of the knife band.

In the prior form of my invention I utilized a band saw and for the saw I propose in the present improvement to substitute a continuous belt 1 of leather or other suitable material, to which is attached a continuous steel band 2 which serves to hold the belt rigid and reinforces it so as to insure a straight cut. At spaced intervals along the belt, there are provided a number of knife holders 3 which are blocks of metal having vertical slots 4. The knife holders are attached to the belt by bolts or rivets 5. Adjustably mounted in each holder is a thin knife blade 6 which is held in adjusted position by set screw 7. The lower end of the knife blade is sharpened to provide a cutting edge.

The belt is trained about pulleys, one of which is shown in Figure 1 at 8. The belt is constantly driven and the pulleys are carried in a vertically movable head, indicated by the numeral 9. The head is moved so that the knives on one side of the belt are intermittently brought in contact with the material to be cut. For this purpose the head is provided with a downwardly extending flange or rib 10, one side of which is grooved or channelled, as at 11, to receive the belt, the knives being offset from the belt by the blocks 4 as described. The belt is thus held in position so that it cannot shift vertically, but must move with the head.

The fabric or other material to be cut is indicated by the numeral 12, and it is supported and moved forward intermittently by the belt 13. Across the belt extends the knife block or knife bar 14, the upper surface of which is grooved as at 15, to receive the knife blades. The fabric passes over the bar 14 and in this way the belt is not injured.

It is advisable to clamp the fabric in position during the cutting operation and for this reason there are arranged at either side of the knives 6 yielding clamping bars 16 which are carried upon angle irons 17 that are suspended from the movable head 9 by bolts 18 slidably received in the head, the upper ends of the bolts carrying nuts 19, which, when the frame is raised, will maintain the bars just below the cutting edges of the knives. When the frame is lowered the bars 16 clamp the fabric on the knife bar, springs 20 surrounding the bolts serving to give adequate pressure. When the head is brought down the knives project into the fabric. As the belt is constantly moving the knives will cut the fabric in a brief moment and, the knives being spaced apart on the belt at short intervals, a momentary depression of the head is all that is needed to cut any width of fabric.

While the details of the improvement have been described fully, it is not necessary that such details be followed in specific embodiments of the invention except insofar as set forth in the claims attached hereto.

What is claimed is:

1. In a machine for cutting fabric or the like, a movable head, a channel in the head opening laterally, a flexible belt received in the channel and guided thereby so that the plane of rotation of the belt is parallel with the fabric, and a plurality of knife blades attached to and projecting beyond the plane of rotation of the belt, the head in its movement causing the plane of rotation of the belt to approach or recede from the fabric in parallel relation therewith.

2. In a machine for cutting fabric or the like, a movable head, a channel in the head opening laterally, a flexible belt received in the channel and guided thereby so that the plane of rotation of the belt is parallel to the fabric, and a plurality of knife blades attached to the outer surface of the belt and projecting below the plane of rotation of the belt, the head in its movement causing the belt to approach the fabric.

3. In a machine for cutting fabric or the like, a horizontally movable support for the fabric, a head movable toward and away from the support, a guiding formation in the head, a continuously moving flexible belt located in the guiding formation, the plane of rotation of the belt being parallel with the fabric support, a knife blade attached to the belt outside the guiding formation and extending below the head, and means on the fabric support adapted to cooperate with said knife blade.

4. In a machine for cutting fabric or the like, a horizontally movable support for the fabric, a head movable toward and away from the support, a guiding formation in the head, a continuously driven flexible belt received in the formation, the plane of rotation of the belt being parallel to said support, a plurality of knife blades attached to the belt outside the guiding formation and extending below the plane of rotation of the belt, and means on the support adapted to cooperate with the knife blades.

5. In a machine for cutting fabric or the like, a horizontally movable support for the fabric, a head movable toward and away from the support, a side opening guiding formation in the head, a continuously driven flexible belt received in the formation, the plane of rotation of the belt being parallel to the fabric, a stiffening member associated with the belt, and a blade attached to and projecting below the belt in a position to enter the fabric.

6. In a machine for cutting fabric or the like, a continuously moving belt, a movable head, a side opening channel in the head to receive and guide the belt so that the plane of rotation thereof is parallel with the fabric, a plurality of knife blades attached to the belt, and individually mounted yielding clamping bars immediately adjacent each side of the path of the knife blade and movable with the head.

7. In a machine for cutting fabric or the like, a continuously moving belt, a movable head, a guideway in the head to engage and laterally guide the belt, a knife blade attached to the belt, a horizontally movable support for the fabric below the head and in parallel relation with the path of rotation of the knife blade, individually mounted yielding clamping bars directly at the sides of the belt and movable with the head, and additional means on the movable support adapted to cooperate with the individual clamping bars and with the knife blade.

HAROLD A. DENMIRE.